(12) United States Patent
Speckmann et al.

(10) Patent No.: US 8,508,243 B2
(45) Date of Patent: Aug. 13, 2013

(54) INDUCTIVE INCREMENTAL DISPLACEMENT SENSOR, METHOD FOR DETERMINING THE DISPLACEMENT OF A FIRST OBJECT RELATIVE TO A SECOND OBJECT, AND INDUCTIVE SENSOR UNIT

(75) Inventors: Christian Speckmann, Bensheim (DE); Ulrich Ehrenfried, Mannheim (DE)

(73) Assignee: Pepperl + Fuchs GmbH, Mannheim (DE)

( * ) Notice: Subject to any disclaimer, the term of this patent is extended or adjusted under 35 U.S.C. 154(b) by 701 days.

(21) Appl. No.: 12/528,464

(22) PCT Filed: Mar. 3, 2008

(86) PCT No.: PCT/EP2008/001678
§ 371 (c)(1), (2), (4) Date: Apr. 13, 2010

(87) PCT Pub. No.: WO2008/104405
PCT Pub. Date: Sep. 4, 2008

(65) Prior Publication Data
US 2010/0188104 A1   Jul. 29, 2010

(30) Foreign Application Priority Data
Mar. 1, 2007 (DE) .......................... 10 2007 010 030

(51) Int. Cl.
*G01R 27/28* (2006.01)
*G01B 7/14* (2006.01)

(52) U.S. Cl.
USPC ...................... 324/656; 324/654; 324/207.17

(58) Field of Classification Search
USPC ..................................... 324/654–657, 207.17
See application file for complete search history.

(56) References Cited

U.S. PATENT DOCUMENTS

| 4,893,078 A | 1/1990 | Auchterlonie |
| 5,003,260 A | 3/1991 | Auchterlonie |
| 6,852,937 B2 * | 2/2005 | Zapf et al. .................. 200/61.88 |
| 2001/0020846 A1 * | 9/2001 | Miyata ..................... 324/207.17 |
| 2002/0175060 A1 * | 11/2002 | Zapf et al. .................. 200/61.88 |

FOREIGN PATENT DOCUMENTS

| DE | 31 00 486 A1 | 2/1982 |
| DE | 197 01 319 A1 | 7/1998 |
| DE | 199 54 267 A1 | 8/2001 |
| EP | 1164358 A1 | 12/2001 |
| WO | WO 99/54687 | 10/1999 |
| WO | WO 2004/027994 A1 | 4/2004 |

OTHER PUBLICATIONS

PCT, "International Preliminary Report on Patentability", International Application No. PCT/EP2008/001678, International Filing Date Mar. 3, 2008.

* cited by examiner

*Primary Examiner* — Melissa Koval
*Assistant Examiner* — Farhana Hoque
(74) *Attorney, Agent, or Firm* — Hoffman Warnick LLC

(57) ABSTRACT

The inductive incremental displacement sensor is characterized in that the first sensor unit and the second sensor unit each have a first inductive sensor and a second inductive sensor disposed at a distance from each other and that the first sensor unit and the second sensor unit deliver a switching signal relevant to a conductive region of the graduated track when the difference or the ratio of the detection signals from the inductive sensors allocated to the respective sensor unit as generated by the conductive region is less than a specifiable threshold. Furthermore, the invention relates to a method for determining the displacement of a first object relative to a second object as well as to an inductive sensor unit.

18 Claims, 3 Drawing Sheets

INDUCTIVE INCREMENTAL DISPLACEMENT SENSOR, METHOD FOR DETERMINING THE DISPLACEMENT OF A FIRST OBJECT RELATIVE TO A SECOND OBJECT, AND INDUCTIVE SENSOR UNIT

FIELD OF THE INVENTION

The present invention relates in a first aspect to an inductive incremental displacement sensor.

In another aspect, the invention relates to a method for determining the displacement of a first object relative to a second object.

Finally, the invention relates to an inductive sensor unit.

RELATED ART

A generic inductive incremental displacement sensor is used to determine a displacement of a first object relative to a second object and is disclosed, for example, in DE 197 01 319 A1. Such an incremental displacement sensor has at least one graduated track mountable on the first object and having periodically alternating conductive regions and insulating regions, and at least one scanning unit mountable on the second object for scanning the graduated track with a first sensor unit and a second sensor unit which are laterally spaced from each other by a distance $d=n*(p/2)+q$, wherein n is an integer or zero, p is the pitch of the graduated track, 0 is $<|q|<p/2$, and, in particular, $q=0.25p$. Furthermore, an evaluation unit is provided for determining the displacement on the basis of switching signals delivered by the first sensor unit and the second sensor unit.

In a generic method, which is also described in DE 197 01 319 A1, the following method steps are carried out. At least one graduated track having periodically alternating conductive regions and insulating regions is mounted on a first object. On a second object there is mounted a scanning unit for scanning the graduated track, which scanning unit has at least a first sensor unit and a second sensor unit, which are laterally spaced from each other by a distance $d=n*(p/2)+q$, wherein n is an integer or zero, p is the pitch of the graduated track, and $0<|q|<p/2$, and, in particular, $q=0.25p$. The displacement of the first object relative to the second object is determined from the switching signals delivered by the sensor units.

A generic inductive sensor unit has a first inductive sensor and a second inductive sensor disposed at a distance from said first sensor, and also a processor for processing the detection signals from the first and second inductive sensors.

Inductive incremental displacement sensors are also described in DE 31 00 486 A1, EP 1 071 927 B1, U.S. Pat. No. 4,893,078, U.S. Pat. No. 5,003,260, EP 1 164 358 A1, WO 2004/027994 A1 and DE 199 54 267 A1.

Incremental sensors are used to measure position changes. For doing so, two spaced sensors each determine the position of a graduated track. The movement of the graduated track relative to the sensors can be determined by counting the individual pulses. Since the signals generated by the two sensors have a phase displacement of, for example, 90°, it is also possible to determine the direction of movement.

If inductive sensors are used with the incremental sensor, difficulties arise with the lateral approach of a metal object, for example, a conductive region of the graduated track, due to the dependency of the switch point of the sensors on the distance of the sensor from the graduated track. The closer the conductive region of the graduated track is to the sensor, the sooner it is detected.

SUMMARY OF THE INVENTION

It is an object of the invention to provide an inductive incremental sensor and a method for determining the displacement of a first object relative to a second object, in which reliable measurement results are obtained largely independently of the actual distance of the sensors from a graduated track. Furthermore, an inductive sensor unit is to be provided with which the lateral position of a target object can be determined largely irrespectively of distance.

The inductive incremental sensor of the aforementioned type is further developed, according to the invention, in that the first sensor unit and the second sensor unit each have a first inductive sensor and a second inductive sensor disposed at a distance from said first sensor, and in that the first sensor unit and the second sensor unit deliver a switching signal relevant to a conductive region of the graduated track when the difference or the ratio of the detection signals from the inductive sensors allocated to the respective sensor unit as generated by this conductive region is less than a specifiable threshold.

The method described above is further developed, according to the invention, in that sensor units having in each case a first inductive sensor and a second inductive sensor disposed at a distance from said first sensor are used and in that the sensor units are operated in such a way that they provide a switching signal allocated to a conductive region of the graduated track when the difference or the ratio of the detection signals from the first inductive sensor and the second inductive sensor allocated to the respective sensor unit as generated by this conductive region is smaller than a specifiable threshold.

The aforementioned sensor unit is further developed, according to the invention, in that the processor provides a switching signal allocated to a lateral displacement of the object, particularly the metal object, when the difference or the ratio of the detection signals generated by this object in the first inductive sensor and the second inductive sensor is below a specifiable threshold.

A first main concept of the invention consists in the realization that the distance-dependency of detection signals from inductive sensors in the situation involving the measurement of a target object when moving past the sensor can be largely eliminated in a simple manner by always using two sensors per sensor unit.

A further main concept can thus be seen in the fact that the sensor units each having at least two inductive sensors are operated in such a way that a switching signal is delivered, i.e., switching from ON to OFF or vice versa, as soon as the detection signals delivered by the inductive sensors allocated to a sensor unit are virtually equal. In other words, the sensor unit reverses when the difference or the ratio of the detection signals from the two allocated sensors is smaller than a specifiable threshold.

A first important advantage of the solution provided by the invention can be seen in the fact that a simple configuration is sufficient to achieve independency of the distance from the target object, particularly from the graduated track of an incremental displacement sensor. As a result, there is considerably improved operational reliability in general and greater functional reliability of the inductive incremental displacement sensor and of the corresponding method.

Using the sensor of the invention, it is possible to attain particularly precise switching, the switching signal being very reliably generated when the object to be detected is positioned with its center exactly in front of the sensor.

The aforementioned advantages and features give rise to new application possibilities for inductive incremental displacement sensors. Provisions hitherto made on such devices for keeping the distance of the sensor from the graduated track as constant as possible can now be configured with less cumbersome dimensions, thereby achieving, in addition, considerable cost savings.

The terms "conductive region" and "insulating region" as used herein are to be understood in a relative sense and should be broadly interpreted. In principle, it is only important for the regions of the graduated track to be sufficiently different in terms of their damping properties for inductive sensors that they can be distinguished by these inductive sensors with sufficient accuracy.

In a particularly preferred variant of the incremental displacement sensor of the invention, the first inductive sensor allocated to a sensor unit is disposed at a distance from the second inductive sensor of said sensor unit such that the detection signal of the first sensor generated by a conductive region of the graduated track just lies on an ascending slope when the detection signal of the second sensor generated by the same conductive region lies on the descending slope. Due to the big change in the detection signals in the slope region during lateral movement of the target object, which in this case is a conductive region of the graduated track, the position sensitivity is high and thus the detection of the center of the conductive region is particularly precise.

Quantitatively, it can be advantageous if, for example, the first inductive sensor allocated to a sensor unit is disposed at a distance from the second inductive sensor of said sensor unit such that the detection signals from the first sensor and the second sensor generated by the same conductive region of the graduated track plotted against a lateral relative displacement of the graduated track relative to the scanning unit intersect in a region of +/−20% of the total signal deviation about the mean of the signal maximum, preferably +/−10% and more particularly +/−5% of the total signal deviation about the mean of the signal maximum.

In a simple configuration, for example, the first inductive sensor allocated to a sensor unit is disposed at a distance of half the pitch of the graduated track from the second inductive sensor of said sensor device.

Optionally, the sensors and/or the sensor units can be integrated in the scanning unit such that their lateral spacing can be adjusted by means of, for example, adjustment screws.

In another simple and preferred variant, the distance of the first sensor from the second sensor of a sensor unit is equal to the length of a conductive region in the longitudinal direction of the graduated track.

Furthermore, particular preference is given to configurations in which the conductive regions and the insulating regions of the graduated track are of the same length in the longitudinal direction of the graduated track. A particular advantage of the invention consists just in that, for such graduated tracks, it is possible to set a constant pulse-pause-ratio independently of distance. A remotely distanced graduated track generates virtually the same switching signal per pitch as a graduated track which is very close to the scanning unit. In particular, the invention makes it possible to achieve the 1:1-pulse-pause-ratio needed for detecting the direction of movement virtually independently of distance. For this purpose it is possible, in particular, to resort to simple evaluation methods known per se.

Preferably, the distance d between the sensor units is $d=np+/-0.25p$. Evaluation concerning the direction of relative movement is then relatively easy to carry out and it is possible to resort to known evaluation algorithms.

In principle, the graduated track can be formed by any periodic arrangement in a direction of extension of conductive and non-conductive regions. For example, it can be a simple perforated grid.

In a particularly preferred variant of the method of the invention, the threshold for avoiding switch bouncing is set immediately after a switching event from a first value S to a second value H, wherein, in particular, the second value H can be higher than the first value S, and the threshold is reset to the first value S as soon as the detection signal of the first inductive sensor deviates from the detection signal of the second sensor by more than the second value H. For this as well as for other applications, S can be very small, in particular, near to zero. When S is very small, the consequence will be that a switching process will be triggered if the detection signals from the first and the second sensors are virtually identical.

Using this special method of direction-dependent hysteresis, bouncing at the switchover point is avoided and, in particular, a direction-independent switch point is achieved.

Other characteristics, properties, and advantages of the invention will be described below with reference to the accompanying diagrammatic figures; in which:

DETAILED DESCRIPTION OF THE INVENTION

Figure 2:
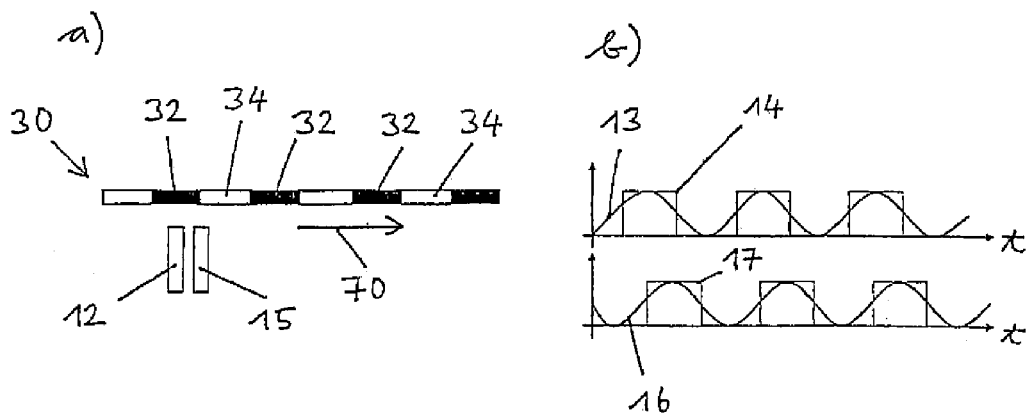
FIG. 2 is an incremental displacement sensor according to the prior art.

An incremental displacement sensor according to the prior art will be described first, with reference to FIG. 2. Essentially, in this measurement principle, a graduated track 30 having a periodic arrangement of conductive regions 32 and non-conductive regions 34 is mounted on a first object, which is not shown in FIG. 2a), and a scanning unit with two inductive sensors 12, 15 is mounted on a second object, which is likewise not shown in FIG. 2a).

Movement or displacement of the first object relative to the second object, i.e., of the graduated track 30 relative to the pair of sensors 12, 15, is indicated by an arrow 70. The sensors 12, 15 are inductive sensors which detect damping of an oscillator by a metal object located in the vicinity thereof, in this case a conductive region 32 of the graduated track 30, and generate a detection signal therefrom. The detection signals 13, 16 generated on displacement of the graduated track 30 relative to the sensors 12, 15 are schematically plotted against the time axis t in the diagram shown in FIG. 2b). The detection signal of the inductive sensor 12 is designated herein by the reference numeral 13, and the detection signal of the sensor 15 is correspondingly designated by the reference numeral 16. The sensors 12 and 15 are spaced from each other at a distance of approximately a quarter of the pitch of the graduated track 30 so that the substantially sinusoid detection signals 13 and 16 have a phase displacement of approximately 90°. In the direction of movement indicated by the arrow 70, the detection signal 13 of the sensor 12 runs ahead of the detection signal 16 of the sensor 15. In general, the sinusoid detection signals 13, 16 are converted to rectangular signals 14, 17, which are evaluated by means of easy logic circuits known per se.

The direction of relative movement can be determined from the relative chronological sequence of the signals, and the absolute value of the velocity can be determined from the frequency of the detection signals.

When conventional sensors are used, the switch point attained in lateral approach is dependent on the distance of the sensors from the graduated track. For example, if a perforated sheet is used as a graduated pattern, the closer the land of such a perforated sheet is to the sensor, the sooner it will be detected. This also means that it is not possible to generate a constant pulse-pause-ratio. A remotely distanced perforated sheet generates only a short damped signal per pitch, whereas a closely distanced perforated sheet generates a very long damped signal and only a short undamped signal. With conventional inductive sensors, the 1:1-pulse-pause-ratio desired for detection of the direction of movement can only be generated for a very specific distance. The invention remedies this.

An exemplary embodiment of an inductive incremental displacement sensor of the invention, in which the aforementioned disadvantages are eliminated, is described with reference to FIG. 1 and also FIGS. 3 and 4.

Figure 1:
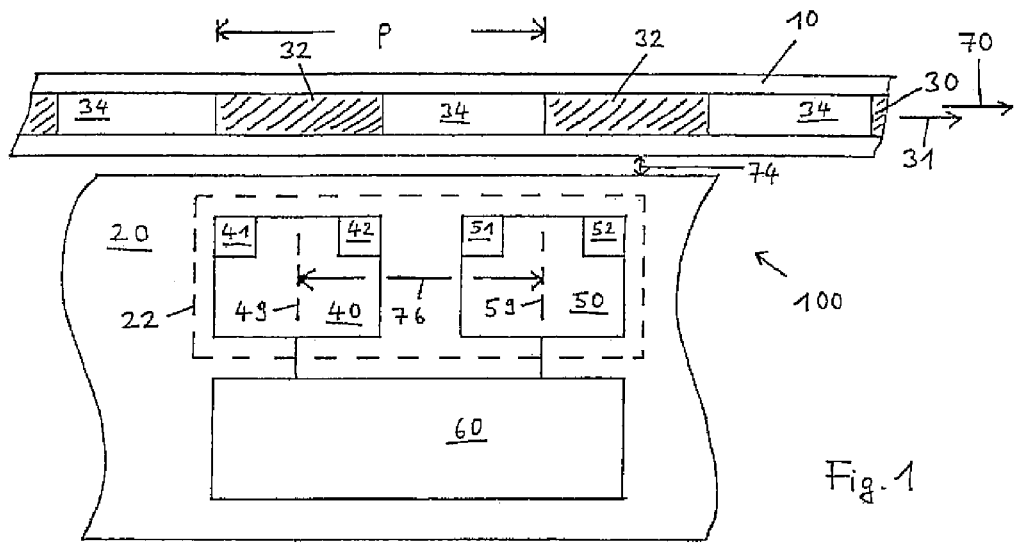
FIG. 1 is a diagram illustrating an exemplary embodiment of the inductive incremental displacement sensor of the invention.

The inductive incremental displacement sensor 100 of the invention diagrammatically illustrated in FIG. 1 has as essential components a graduated track 30 mounted on a first object 10, a scanning unit 22 mounted on a second object 20, and an evaluation unit 60 likewise mounted on the second object 20 in this exemplary embodiment. By means of the incremental displacement sensor 100, a relative movement, depicted by an arrow 70, of the first object 10 relative to the second object 20 can be determined largely independently of the distance 74 of the objects from each other.

The graduated track 30 consists of electrically conductive regions 32 and electrically nonconductive regions 34, which alternate at regular intervals with a pitch p. In the example shown, the conductive regions 32 and the nonconductive regions 34 each have the same length in the longitudinal direction 31 of the graduated track 30. Theoretically, however, other mark/space ratios are also possible. According to the invention, the scanning unit 22 has two inductive sensor units 40, 50 of the invention. The first inductive sensor unit 40 has a first inductive sensor 41 and a second inductive sensor 42, which in the example shown are spaced by a lateral distance of 0.5p of the graduated track 30, or at a distance equal to the length of a conductive region 32, which means the same for the purposes of this exemplary embodiment.

The distance between the sensors 41, 42 should be understood herein as meaning substantially the distance between the coil axes of the coils included in the respective inductive sensors.

The second inductive sensor unit 50 similarly comprises a first inductive sensor 51 and a second inductive sensor 52, which are likewise disposed at a lateral distance of 0.5p. Center axes of the sensor units 40, 50 are designated by the reference numerals 49 and 59. In the longitudinal direction 31 of the graduated track 30, these center axes 49, 59 have a spacing 76 of 0.75p. According to the invention this distance can be expressed by the general formula n*(p/2)+0.25p, in which n is a natural number or zero and p is the pitch of the graduated track.

The essentials of the inventive idea will now be explained with reference to FIGS. 3 and 4. Like components are designated by like reference numerals in each figure.

Figure 3:
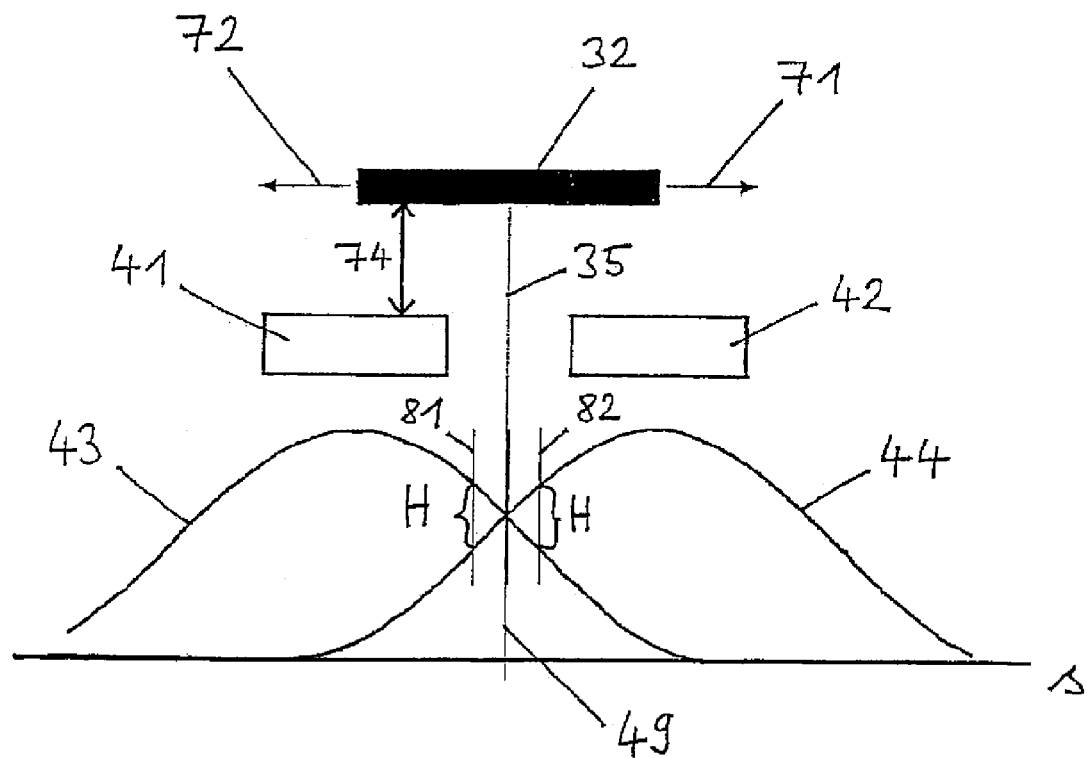
FIG. 3 is a diagram illustrating the mode of operation of an inductive sensor unit of the invention.

FIG. 3 is a diagrammatic illustration of a first inductive sensor 41 and a second inductive sensor 42, which are allocated to one and the same sensor unit 40 of the invention, which is not shown in any greater detail herein. Diagrammatically illustrated above the inductive sensors 41, 42 is a metal target 32, which can in particular be a conductive region 32 of a graduated track 30.

Below the inductive sensors 41, 42, the detection signals 43, 44 generated by the sensors 41, 42 are diagrammatically plotted against a displacement s of the target 32 relative to the sensors 41, 42 as shown in FIG. 3. The reference numeral 35 designates an axis of symmetry of the target 32. When the target 32 moves in the direction indicated by the arrow 72, the detection signal 44 from the sensor 42 diminishes, while the detection signal 43 from the sensor 41 increases to a maximum. On the other hand, the detection signal 44 from the sensor 42 increases to a maximum and the detection signal 43 from the sensor 41 diminishes correspondingly when the target 32 moves in the direction indicated by the arrow 71. Because of the dependency of the detection signals 43, 44 on the distance 74 of the sensors 41, 42 from the target 32, the lateral position of the target 32 relative to the sensors 41, 42 can only be determined relatively imprecisely from either of the individual signals as such.

When, however, the center axis 35 of the target 32 is located exactly midway between the inductive sensors 41, 42 as in the situation shown in FIG. 3, i.e., when it coincides with the center axis 49 of the sensor unit 40, the detection signals 41, 42 are substantially the same, or in other words, they deviate from each other by less than a small specifiable threshold. By means of the inductive sensor unit of the invention, it is thus possible to determine very precisely whether a target 32 to be detected is exactly centered in front of the sensor unit 40. This inductive sensor unit of the invention has considerable advantages, particularly for applications with inductive incremental displacement sensors, as will be explained with reference to FIG. 4.

A graduated track 30 and also inductive sensors 41, 42 of a sensor unit 40 are illustrated there, also in diagrammatic form.

In the method of the invention, two coils or sensors per sensor unit are used for detecting a target, which in particular is a conductive region 32 of a graduated track 30. These coils have a distance of, for example, half a perforation/land pitch, or 0.5p. Therefore, if the target is centered in front of the sensor unit, the coil axes will coincide with the edges of the target. Switching takes place when the signals from the two sensors are equal. This will be the case regardless of the distance of the target when the target is centered exactly midway between the two individual sensors. Because the perforated grid in a preferred embodiment has a 1:1 ratio of land width to perforation width, an OFF signal can be generated in the perforation center, thus making it possible to generate a 1:1 mark/space ratio here also. When the analog output signal of the first sensor is greater than that of the second sensor, the switching signal is turned on, otherwise it is turned off. The positions of these ON and OFF switch points are largely independent of the grid spacing and the shape of the start-up curve.

Figure 4:
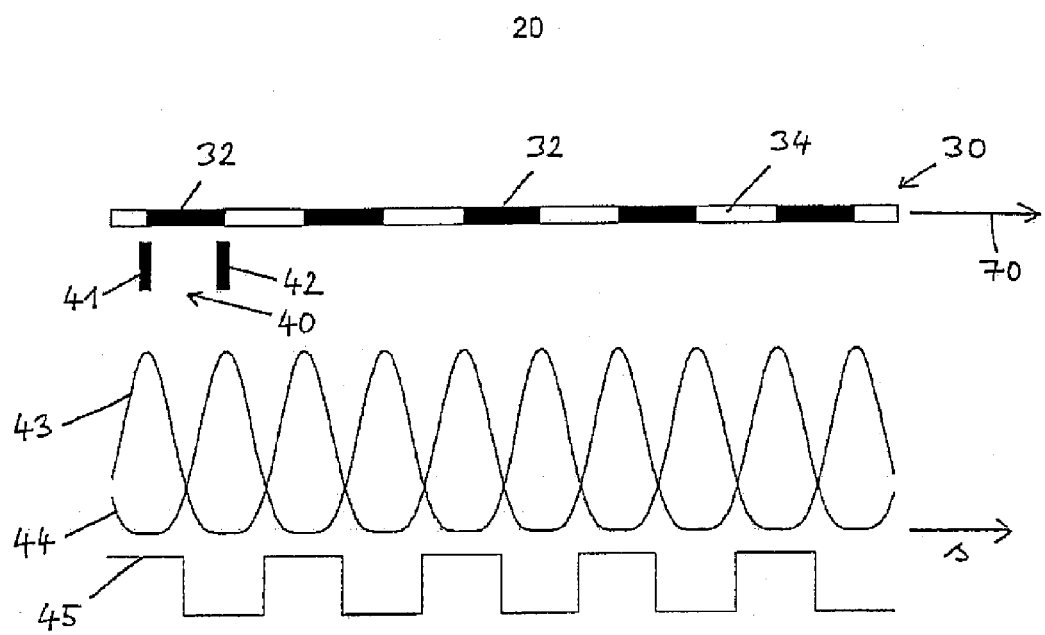
FIG. 4 is a diagram illustrating the mode of operation of an inductive incremental displacement sensor of the invention.

A precise, distance-independent rectangular signal can thus be generated using such a sensor pair, as shown in FIG. 4. By means of a second sensor pair, i.e., a second sensor unit at a distance of 0.25p, or of 0.75p as in FIG. 1, it is possible to generate a second signal with a 90° phase shift. In this way a very precise incremental displacement sensor can be constructed.

Furthermore, when plotted against a displacement path s, the detection signals 43, 44 of the sensors 41, 42 are inversely phased due to the spacing of the sensors 41, 42 at a distance of 0.5p. Whenever the detection signals 43, 44 are equal, i.e., when the curves 43, 44 intersect, the sensor unit 40 will provide a switching signal 45, which in FIG. 4 is likewise plotted against the displacement path s. The switching signal is either HIGH or LOW, depending on whether the signal 43 is greater or smaller than the signal 44. As a result, the switching signal 45 will always change precisely when the conductive region 32 is exactly centered in front of the sensor unit 40.

Owing to the characteristics of the inductive sensor unit 40 of the invention described above, this will mainly take place independently of the distance of the sensor unit 40 from the graduated track 30.

A variant of the method of the invention will now be explained with reference to FIG. 3. A directionally dependent hysteresis is employed in this variant in order to avoid a switch bounce, and also to maintain a directionally independent switch point. As explained above, for example when the target 32 moves in the direction indicated by the arrow 72, the sensor unit 40 will switch exactly when the detection signal 43 from the inductive sensor 41 becomes greater than the signal 44 from the sensor 42. Should the perforation track forming the graduated track remain exactly in this position, there is the risk of bouncing if, due to vibrations or interfering pulses, the signal 44 briefly becomes greater than the signal 43 and the sensor unit 40 consequently switches rapidly back and forth. In order to avoid this, after the first switchover when the signal 43 becomes greater than the signal 44 for the first time, the switch-off threshold is set for the time being to a specific value below the switch-on threshold, i.e., there will not be a switch-off until the signal 44 is greater or smaller than the signal 43 by more than the amount H. Not until the perforated track, i.e., the graduated track, advances and the detection signal 43 becomes distinctly greater, namely by more than H, than the detection signal 44 will the switch-off threshold be reversed and the switch-off conditions reset to "detection signal 44 greater than detection signal 43". In practice the output then switches at the same switch point independently of direction, but does not bounce because of the prevailing hysteresis. The distances corresponding to the reversal of the hysteresis are indicated in FIG. 3 by the vertical lines 81, 82.

The two methods described above can be employed independently. By using two sensor coils, it is thus generally possible to carry out center detection, by means of which a sensor having a constant lateral switch point can be created.

Furthermore, by reversing the hysteresis according to the previous history of the sensor, it is possible to construct a sensor whose switch point always resides in the same point regardless of the direction of movement and still prevents switch bouncing in a very reliable manner.

The present invention provides an inductive incremental displacement sensor, a method for detecting the relative displacement of two objects, and also an inductive sensor unit with which the relative lateral position of the two objects can be determined very precisely and to a large extent independently of the distance between them. This gives rise to diverse novel applications, and considerably less rigorous demands are imposed on methods for keeping distances always constant.

The invention claimed is:

1. An inductive incremental displacement sensor for determining a displacement of a first object relative to a second object, comprising:

at least one graduated track mountable on the first object and having periodically alternating conductive regions and insulating regions;

at least one scanning unit mountable on the second object for scanning the graduated track with a first sensor unit and a second sensor unit, which are laterally spaced from each other by a distance $d=n*(p/2)+q$, wherein n is an integer or zero, p is a pitch of the graduated track, and $0<|q|<p/2$; and an evaluation unit for determining the displacement based on switching signals delivered by the first sensor unit and the second sensor unit;

wherein the first sensor unit and the second sensor unit each have a first inductive sensor and a second inductive sensor spaced at a distance from each other, the conductive regions and the insulating regions have different damping properties for the first inductive sensor and the second inductive sensor and are differentiated by the first inductive sensors and by the second inductive sensors based on different damping properties; and wherein the first sensor unit and the second sensor unit deliver a switching signal relevant to a conductive region of the graduated track when a difference or a ratio of the detection signals from the first and second inductive sensors allocated to the respective sensor unit as generated by the conductive region is less than a specifiable threshold.

2. The incremental displacement sensor as defined in claim 1, wherein $q=0.25p$.

3. The incremental displacement sensor as defined in claim 1, wherein the first inductive sensor allocated to a sensor unit is disposed at a distance from a second inductive sensor of the sensor unit such that the detection signal from the first sensor generated by a conductive region of the graduated track lies on an ascending slope when the detection signal from the second sensor generated by the same conductive region lies on a descending slope.

4. The incremental displacement sensor as defined in claim 1, wherein the first inductive sensor allocated to a sensor unit is disposed at a distance from the second inductive sensor of the sensor unit such that the detection signals from the first sensor and from the second sensor generated by a same conductive region of the graduated track plotted against a lateral relative displacement of the graduated track relative to the scanning unit are in a region of +/−20% of a total signal deviation about a mean of the signal maximum.

5. The incremental displacement sensor as defined in claim 1, wherein the first inductive sensor allocated to a sensor unit is disposed at a distance from the second inductive sensor of the sensor unit such that the detection signals from the first sensor and from the second sensor generated by the same conductive region of the graduated track plotted against a lateral relative displacement of the graduated track relative to the scanning unit are in a region of +/−10% of a total signal deviation about a mean of the signal maximum.

6. The incremental displacement sensor as defined in claim 1, wherein the first inductive sensor allocated to a sensor unit is disposed at a distance from the second inductive sensor of the sensor unit such that the detection signals from the first sensor and from the second sensor generated by the same conductive region of the graduated track plotted against a lateral relative displacement of the graduated track relative to the scanning unit are in a region of +/−5% of a total signal deviation about a mean of the signal maximum.

7. The incremental displacement sensor as defined in claim 1, wherein the first inductive sensor allocated to a sensor unit is disposed at a distance of half the pitch p of the graduated track from the second inductive sensor of the same sensor device.

8. The incremental displacement sensor as defined in claim 1, wherein the distance of the first sensor from the second sensor of a sensor unit is equal to a length of a conductive region in a longitudinal direction of the graduated track.

9. The incremental displacement sensor as defined in claim 1, wherein the conductive regions and the insulating regions are of the same length in the longitudinal direction of the graduated track.

10. The incremental displacement sensor as defined in claim 1, wherein the graduated track is in a form or a perforated grid.

11. The incremental displacement sensor as defined in claim 1, wherein the sensor is designed for execution of a method for determining a displacement of the first object relative to the second object.

12. A method for determining a displacement of a first object relative to a second object, wherein at least one graduated track having periodically alternating conductive regions and insulating regions is mounted on the first object, wherein a scanning unit for scanning the graduated track is mounted on the second object, wherein the scanning unit has at least one first sensor unit and one second sensor unit spaced from each other at a lateral distance $d=n*(p/2)+q$, wherein n is an integer or zero, p is a pitch of the graduated track, and $0<|q|<p/2$, and wherein the displacement is determined from switching signals delivered by the sensor units, wherein sensor units having in each case a first inductive sensor and a second inductive sensor disposed at a distance therefrom are used, the conductive regions and the insulating regions have different damping properties for the first inductive sensors and the second inductive sensors and can be differentiated by the first inductive sensors and by the second inductive sensors based on the different damping properties, and the sensor units are operated such that they provide a switching signal allocated to a conductive region of the graduated track when a difference or a ratio of the detection signals from the first inductive sensor and from the second inductive sensor allocated to the respective sensor unit as generated by the conductive region is smaller than a specifiable threshold.

13. The method as defined in claim 12, wherein an incremental displacement sensor is used.

14. The method as defined in claim 12, wherein $q=0.25p$.

15. The method as defined in claim 12, wherein a threshold for avoiding switch bouncing is set immediately after a switching event from a first value S to a second value H and the threshold is reset to the first value S when the detection signal from the first inductive sensor deviates from the detection signal from the second sensor by more than the second value H.

16. An inductive sensor unit for distance-independent determination of a lateral position of an object, comprising:
a first inductive sensor and a second inductive sensor disposed at a distance therefrom;
a processing unit for processing the detection signals from the first inductive sensor and from the second inductive sensor;
wherein the first inductive sensors and the second inductive sensors are adapted to differentiate between conductive regions and insulating regions based on different damping properties of the conductive regions and the insulating regions for the first inductive sensors and the second inductive sensors; and
wherein the processing unit delivers a switching signal relevant to a lateral movement of the object when a difference or a ratio of the detection signals generated by the object in the first inductive sensor and the second inductive sensor is below a specifiable threshold.

17. The inductive sensor unit as defined in claim 16, wherein the object is a conductive region of a periodically graduated track of an incremental sensor.

18. The inductive sensor unit as defined in claim 16, wherein the object is a conductive region of a periodically graduated track of an incremental sensor.

* * * * *